Jan. 5, 1932.        L. J. TERRELL         1,839,715
                   CHAIN TIGHTENING TOOL
                    Filed Dec. 19, 1929
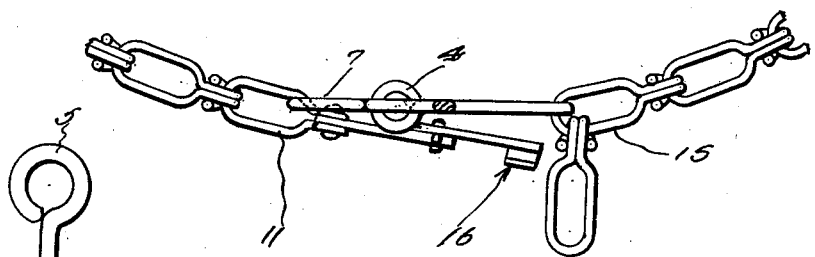
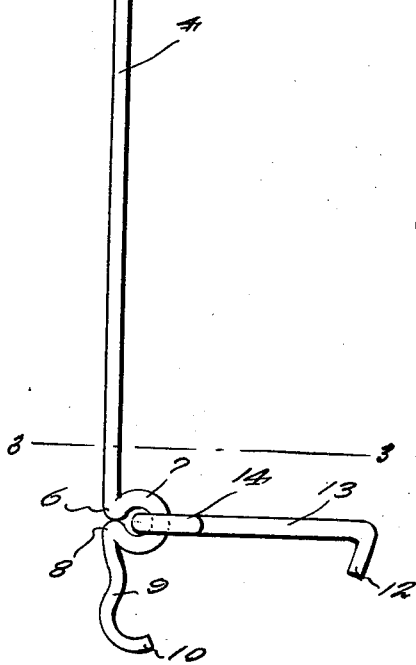
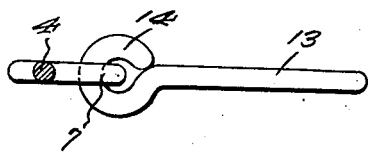
Inventor
Lossie J. Terrell
By Clarence A. O'Brien
                    Attorney Patented Jan. 5, 1932

1,839,715

UNITED STATES PATENT OFFICE

LOSSIE JAMES TERRELL, OF JASPER, GEORGIA

CHAIN TIGHTENING TOOL

Application filed December 19, 1929. Serial No. 415,290.

This invention relates to an improved tightening tool for automobile anti-skid chains, and it has more particular reference to the form of tool which is used for drawing the free end portion of the side chains together in order to facilitate tight fastening of the side chains, and to expedite manipulation of the usual fastener.

Briefly, the invention has reference to a tool embodying a lever having a link engaging hook at one end, and a pivoted hook-equipped link connected thereto adjacent said one end, the relationship of the parts being such as to permit the companion hook to be engaged with the complemental links of the side chains for conveniently drawing the links together and to facilitate securing of the fastener.

In carrying the invention into effect, I have evolved and produced a structure which I believe to be more economical, simple, dependable, and efficient than similar prior art tools.

In the drawings:

Figure 1 is a view showing a portion of the side chain, the fastener, and the improved tool as it is used.

Figure 2 is an elevational view of the tool per se.

Figure 3 is a horizontal section on the line 3—3 of Figure 2.

Referring to the drawings in Figure 2, it will be seen that the lever comprises a rod 4 having its upper end bent to provide a suspension eye 5. This is intended to be hung on a nail or the like to suspend the tool in a convenient and readily accessible out of the way position.

Adjacent the opposite end this rod member is bent upon itself as at 6 and then bent as at 7 into a pivot forming eye. The opposite end of the eye is bent as at 8 to form a link engaging hook, the shank portion 9 being of curvate configuration as shown and the terminals 10 being of appropriate form to engage in the chain links 11, as seen in Figure 1.

The companion hook 12 is bent at acute angles with respect to its relatively straight shank portion 13. The shank portion is of the approximate relative length shown and it is provided with an eye 14 pivotally connected at right angles with the eye 7.

With this tool, the hook 12 may be engaged in the chain links 15 and the hook 10 engaged with the links 11. Then, the lever 4 may be swung in a direction from right to left to draw the links 11 and 15 together to facilitate securing of the conventional chain fastener 16 as shown in Figure 1.

The simplicity of the invention is such to make it unnecessary to enter into a lengthy discussion. Therefore, a more prolonged description need not be given.

Minor changes in shape, size, materials and rearrangements of elements may be resorted to within the field of invention claimed if desired.

I claim:

A chain tightening tool comprising a rod of circular shape in cross section and having an eye formed at one end thereof, the rod being bent adjacent the other end to form a closed eye which is located at one side of the rod, the part between the last mentioned eye and the end of the rod being shaped to form a short shank and a hook, the hook being of substantially semi-circular form and a short rod having one end bent to form an eye which engages the eye at the side of the first rod and its opposite end being bent at an angle to form a hook, the first hook being disposed in the plane of the second eye.

In testimony whereof I affix my signature.

LOSSIE JAMES TERRELL.